3,067,252
PREPARATION OF 2,3-DIAZABUTA-1,3-DIENE
Norman P. Neureiter, Baytown, Tex., assignor, by mesne assignments, to Esso Research and Engineering Company, Elizabeth, N.J., a corporation of Delaware
No Drawing. Filed May 15, 1959, Ser. No. 813,368
8 Claims. (Cl. 260—566)

The present invention is directed to a method of preparing a nitrogen compound. More particularly, the invention is concerned with the preparation of diazabutadiene. In its more specific aspects, the invention is concerned with a highly reactive nitrogen-containing unsaturated compound.

The present invention may be briefly described as a method for preparing 2,3-diazabuta-1,3-diene. In the preparation of this compound, formaldehyde is reacted with hydrazine to obtain a white solid polymer. The polymer is heated under a pressure substantially less than atmospheric to an elevated temperature in the range from about 300° to about 550° C. in the presence of an inert gas to form 2,3-diazabuta-1,3-diene and thereafter the 2,3-diazabuta-1,3-diene is recovered as a product.

In forming the white polymer which is employed and from which the diazabutadiene of the present invention is obtained, formaldehyde and hydrazine are reacted in a ratio of about 2 mols of formaldehyde to about 1 mol of hydrazine. The formaldehyde and hydrazine may be reacted at a temperature in the range from about —10° to about 80° C. to obtain the white solid polymer.

The pressure employed in the practice of the present invention is substantially less than atmospheric and may be in the range from about 0.1 to about 100 mm. of mercury but preferably is in the range from about 1 to about 50 mm.

In order to recover the 2,3-diazabuta-1,3-diene, it is necessary to maintain it at a temperature below about —40° C. Therefore, the product is recovered at a temperature in the range from about —40° to about —100° C. in the presence of an inert gas.

The inert gas employed in the practice of the present invention may be any inert gas which is inert relative to the polymer and the diazabutadiene. Such inert gases are nitrogen, helium, argon, and xenon.

The 2,3-diazabuta-1,3-diene has a melting point in the range from about —45° to about —51° C. and boils at approximately —15° C. at 6 mm. pressure. The product is unique in that the molecule has two terminal N-methylene groups. The 2,3-diazabuta-1,3-diene may be represented by the formula:

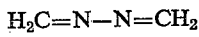

$$H_2C=N-N=CH_2$$

The product is extremely reactive and at temperatures of about 70° F. and upward polymerizes immediately to a transparent glass and eventually to a solid white polymer. At lower temperatures the polymerization is slower, being negligible below the M.P. The 2,3-diazabuta-1,3-diene may be reacted with sulfur dioxide to form a solid polymer. Hence the product is useful in forming polymers, and by virtue of its extreme reactivity is also useful as a chemical intermediate.

A white solid polymer was obtained by reaction of two moles of formaldehyde and one mole of hydrazine in aqueous solution at about 25° C. to obtain a white polymer which was then subjected to a temperature in the range from about 300° to about 400° C. at a pressure in the range from about 1 mm. to 25 mm. of mercury. The product was cooled to a temperature of —80° C. and 2,3-diazabuta-1,3-diene was recovered. The recovered product on warming to room temperature polymerized to a glass-like transparent material and eventually to a white polymer.

By virtue of the extreme reactivity of the recovered product, it is quite useful as a chemical intermediate and as a starting material for formation of other chemicals. Its extreme reactivity is unique and quite advantageous and useful even though it must be handled at low temperatures to prevent polymerization.

The nature and objects of the present invention having been completely described and illustrated, what I wish to claim as new and useful and secure by Letters Patent is:

1. A method for preparing 2,3-diazabuta-1,3-diene which comprises reacting formaldehyde with hydrazine to obtain a white polymer, heating the polymer under a pressure substantially less than atmospheric to a temperature in the range from about 300° to about 550° C. in the presence of an inert gas to form 2,3-diazabuta-1,3-diene, and recovering said 2,3-diazabuta-1,3-diene as a product at a temperature below about —40° C.

2. A method in accordance with claim 1 in which the formaldehyde and hydrazine are employed in a ratio of about 2 moles of formaldehyde to about 1 mole of hydrazine.

3. A method in accordance with claim 1 in which the pressure is in the range from about 0.1 mm. to about 100 mm. of mercury.

4. A method in accordance with claim 1 in which the product is recovered at a temperature in the range from about —40° C. to about —100° C.

5. A method in accordance with claim 1 in which the inert gas is nitrogen.

6. A method in accordance with claim 1 in which the inert gas is helium.

7. A method in accordance with claim 1 in which the inert gas is argon.

8. A method in accordance with claim 1 in which the inert gas is xenon.

References Cited in the file of this patent

Pulvermacher: Ber. Deut. Chem., vol. 26 (1893), 4 pp. Pat. Off. Lib.
Wieland: "Die Hydrazine," p. 97 (1 p.), published by Verlag Von Ferdinand Enke, Stuttgart, Ger. (1913). Pat. Off. Lib.
Bloutt et al.: Jour. Amer. Chem. Soc., vol. 70, pp. 194–198 (1948).
Kost et al.: C.A., vol. 51, p. 5054 (1957).